United States Patent
Frank et al.

(10) Patent No.: US 9,800,834 B2
(45) Date of Patent: Oct. 24, 2017

(54) METHOD AND SYSTEM OF GROUP INTERACTION BY USER STATE DETECTION

(71) Applicant: Konica Minolta Laboratory U.S.A., Inc., San Mateo, CA (US)

(72) Inventors: Maria Frank, Santa Clara, CA (US); Ghassem Tofighi, Belmont, CA (US); Nandita Nayak, Santa Clara, CA (US); Haisong Gu, Cupertino, CA (US)

(73) Assignee: KONICA MINOLTA LABORATORY U.S.A., INC., San Mateo, CA (US)

( * ) Notice: Subject to any disclaimer, the term of this patent is extended or adjusted under 35 U.S.C. 154(b) by 0 days.

(21) Appl. No.: 15/339,613

(22) Filed: Oct. 31, 2016

(65) Prior Publication Data
US 2017/0127021 A1 May 4, 2017

Related U.S. Application Data

(60) Provisional application No. 62/249,118, filed on Oct. 30, 2015, provisional application No. 62/301,100, filed on Feb. 29, 2016.

(51) Int. Cl.
*H04N 7/14* (2006.01)
*H04N 7/15* (2006.01)
(Continued)

(52) U.S. Cl.
CPC .......... *H04N 7/15* (2013.01); *G06K 9/00302* (2013.01); *G06K 9/00375* (2013.01);
(Continued)

(58) Field of Classification Search
CPC .. G06K 9/4604; G06K 9/6202; G06K 9/6267; G06K 9/00335; G06K 9/00315;
(Continued)

(56) References Cited

U.S. PATENT DOCUMENTS

8,775,916 B2 * 7/2014 Pulsipher ........... G06K 9/00369
348/169
2013/0144629 A1 6/2013 Johnston et al.
(Continued)

OTHER PUBLICATIONS

Balaban, C.D.; Cohn, J.; Redfern, M.S.; Prinkey, J.; Stripling, R.; Hoffer, M. (2004): Postural Control as a Probe for Cognitive State: Exploiting Human Information Processing to Enhance Performance. International Journal of Human-Computer Interaction, 17(2), 275-286.
Benkaouar, W. (2012): Multimodal detection of Intention of Interaction. Master of Science in Informatics. University Joseph Fourier, Grenoble, France. Informatics.
McColl, D.: Zhang, Z.; Nejat, G. (2011): Human Body Pose Interpretation and Classification for Social Human-Robot Interaction, International Journal of Social Robotic, 3:313-332.
(Continued)

*Primary Examiner* — Binh Tieu
(74) *Attorney, Agent, or Firm* — Buchanan Ingersoll & Rooney PC (57) ABSTRACT

A method is disclosed for detecting interaction between two or more participants in a meeting, which includes capturing at least one three-dimensional stream of data on the two or more participants; extracting a time-series of skeletal data from the at least one three-dimensional stream of data on the two or more participants; classifying the time-series of skeletal data for each of the two or more participants based on a plurality of body position classifiers; and calculating an engagement score for each of the two or more participants. In addition, a method is disclosed for improving a group interaction in a meeting, which includes calculating, for each of the two or more participants, an individual engagement state based on attitudes of the participant, wherein the individual engagement state is an engagement state of the participant to the meeting including an engaged state and a disengaged state.

20 Claims, 7 Drawing Sheets

(51) Int. Cl.

| | | |
|---|---|---|
| *G08B 6/00* | (2006.01) | |
| *G08B 7/00* | (2006.01) | |
| *H04N 13/02* | (2006.01) | |
| *G06K 9/00* | (2006.01) | |
| *G10L 25/57* | (2013.01) | |
| *H04N 13/00* | (2006.01) | |

(52) U.S. Cl.
CPC ..... *G06K 9/00382* (2013.01); *G06K 9/00389* (2013.01); *G08B 6/00* (2013.01); *G08B 7/00* (2013.01); *G10L 25/57* (2013.01); *H04N 13/0203* (2013.01); *H04N 2013/0074* (2013.01)

(58) Field of Classification Search
CPC . H04N 7/15; G06F 17/30516; G06F 17/3053; G06F 17/30598; H04L 67/22; H04L 65/403; H04L 12/1813; H04M 3/568
USPC ............ 348/14.07, 14.08, 14.1, 14.16
See application file for complete search history.

(56) References Cited

U.S. PATENT DOCUMENTS

| | | | |
|---|---|---|---|
| 2014/0145936 A1 | 5/2014 | Gu et al. | |
| 2014/0259034 A1* | 9/2014 | Terrazas | H04N 21/44218 725/12 |
| 2015/0281775 A1* | 10/2015 | Ramaswamy | H04N 21/44213 725/12 |
| 2016/0073054 A1* | 3/2016 | Balasaygun | H04N 7/15 348/14.08 |
| 2016/0234551 A1* | 8/2016 | Allegretti | H04N 21/2407 |
| 2016/0283816 A1* | 9/2016 | Paradkar | G06K 9/4604 |
| 2016/0323640 A1* | 11/2016 | Terrazas | H04N 21/44218 |

OTHER PUBLICATIONS

Sanghvi, J.; Castellano, G.; Leite, I.; Pereira, A.; McOwan, P. W.; Paiva, A. (Eds.) (2011): Automatic Analysis of Affective Postures and Body Motion to Detect Engagement with a Game Companion. HRI'11 Internation Conference on Human-Robot Interaction. Lausanne, Switherland, Mar. 6-9.

Schrammel, J.; Paletta, L.; Tscheligi, M. (2010): Exploring the Possibilities of Body Motion Data for Human Computer Interaction Research, HCI in Work and Learning, Life and Leisure Lecture Notes in Computer Science vol. 6389, 2010, pp. 305-317.

Scherer, S.; Glodek, M.; Layher, G.; Schels, M.; Schmidt, M.; Brosch, T.; Tschechne. S.; Schwenker, F.; Neumann, H.; Palm, G. (2012): A generic framework for the inference of user states in human computer interaction, How patterns of low level behavioral cues support complex user states in HCI, Journal of Multimodal User Interfaces, vol. 6.

Schwarz, J.; Marais, C.; Leyvand, T.; Hudson, E. H.; Mankoff, J. (Eds.) (2014): Combining Body Pose, Gaze, and Gesture to Determine Intention to Interact in Vision-Based Interfaces. CHI14— Conference on Human Factors in Computing Systems. New York.

Vaufrydaz, D.; Johal, W.; Combe, C. (2015): Starting Engagement Detection Toward a Companion Robot Using Multimodal Features. In Robotics and Autonomous Systems, pp. 25.

S. Mota et al., "Automated Posture Analysis for Detecting Learner's Interest Level", IEEE Computer Society Conference on Computer Vision and Pattern Recognition Workshop, Los Alamitos, California, Jun. 18-20, 2003.

D. Gong et al., "Kernelized Temporal Cut for Online Temporal Segmentation and Recognition", Computer Vision ECCV 2012, Heidelberg, Germany, Oct. 7, 2012.

Extended European Search Report dated Mar. 3, 2017 in corresponding European Patent Application No. 16196071.1.

* cited by examiner

METHOD AND SYSTEM OF GROUP INTERACTION BY USER STATE DETECTION

RELATED APPLICATION(S)

This application claims priority to U.S. Patent Application No. 62/249,118, filed on Oct. 30, 2015, and U.S. Patent Application No. 62/301,100, filed on Feb. 29, 2016, the entire contents of which are incorporated herein by reference in their entirety.

FIELD OF THE INVENTION

The present disclosure relates to a method and system of group interaction by user state detection, and more particularly to a method and system for improving interaction among users or between persons and machine, based on detecting user state and generating an engagement score for each user and providing feedback in certain circumstances to one or more of the users.

BACKGROUND OF THE INVENTION

Figure 1:
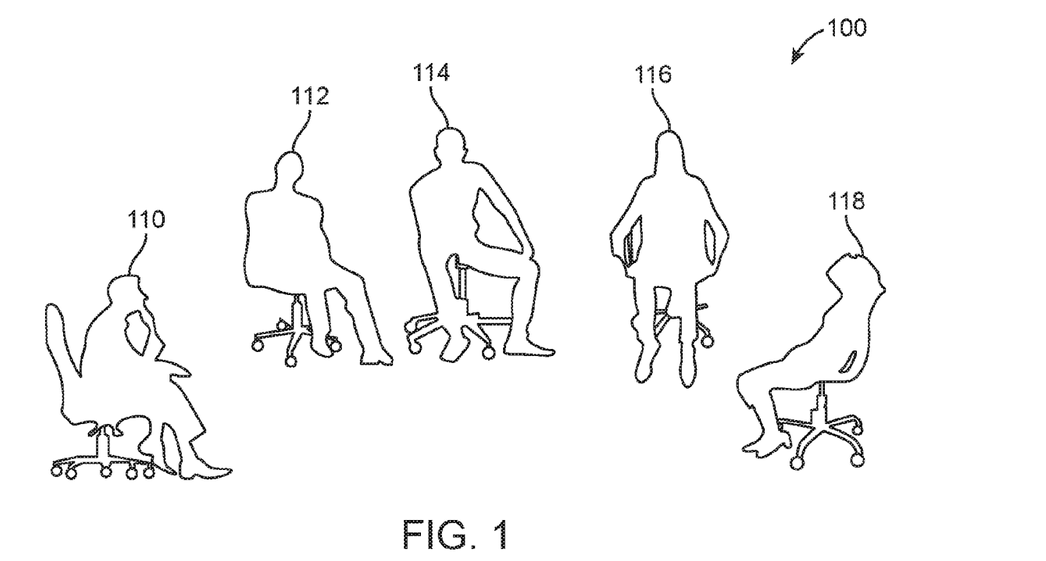
FIG. 1 is an illustration of a collaboration scenario in accordance with an exemplary embodiment.

In a group meeting scenario 100 as shown in FIG. 1, participants 110, 112, 114, 116, 118 discuss, negotiate, present, and create among each other. Most meetings, for example, can be conducted with participants seated on chairs around a table, and occasionally a participant stands in front of a display to present. In addition, more and more meetings are being conducted in distributed situations, for example, via video conferencing, wherein participants are at two or more locations, and not every participant is visible during the presentation or meeting. For example, one or more participants may be hidden at any time during the meeting.

Depending on the group dynamic and the specific activity participants express during the meeting, varying mental states in the group activity are often not accurately observed. For example, the different mental states in the group for each participant can include states of interest such as engagement, stress, attention, excitement, agreement, and/or disagreement.

Accordingly, it would be desirable to understand the varying mental or user states of each individual user or participant and the aggregated group state collocated as distributed in order to improve meeting quality.

SUMMARY OF THE INVENTION

In consideration of the above issue, it would be desirable to have a method and system, which measures, evaluates, and gives feedback on the participants' hidden mental states.

A method is disclosed for detecting interaction between two or more participants in a meeting, the method comprising: capturing at least one three-dimensional (3D) stream of data on the two or more participants; extracting a time-series of skeletal data from the at least one 3D stream of data on the two or more participants; classifying the time-series of skeletal data for each of the two or more participants based on a plurality of body position classifiers; calculating an engagement score for each of the two or more participants based on the classifying of the time-series of skeletal data for each of the two or more participants; and providing a feedback in accordance with at least one of the engagement scores of the two or more participants.

A non-transitory computer readable medium containing a computer program storing computer readable code for detecting interaction between two or more participant is disclosed, the program being executable by a computer to cause the computer to perform a process comprising: capturing at least one three-dimensional (3D) stream of data on the two or more participants; extracting a time-series of skeletal data from the at least one 3D stream of data on the two or more participants; classifying the time-series of skeletal data for each of the two or more participants based on a plurality of body position classifiers; calculating an engagement score for each of the two or more participants based on the classifying of the time-series of skeletal data for each of the two or more participants; and providing a feedback in accordance with at least one of the engagement scores of the two or more participants.

A system is disclosed for detecting interaction between two or more participants, the system comprising: a data input module for capturing at least one three-dimensional (3D) stream of data on two or more participants; a module for extracting a time-series of skeletal data from the at least one 3D stream of data on the two or more participants; and a processor configured to: classify the time-series of skeletal data for each of the two or more participants based on a plurality of body position classifiers; calculate an engagement score for each of the two or more participants based on the classifying of the time-series of skeletal data for each of the two or more participants; and provide a feedback in accordance with at least one of the engagement scores of the two or more participants.

A method is disclosed for improving a group interaction in a meeting in which two or more participants participate in, the method comprising: calculating, for each of the two or more participants, an individual engagement state based on attitudes of the participant, wherein the individual engagement state is an engagement state of the participant to the meeting including an engaged state and a disengaged state; calculating a group engagement state based on the attitudes of the two or more participants, wherein the group engagement state is an engagement state of the two or more participants to the meeting; and providing a feedback, comprising: proving a group warning to all of the participants regardless of their individual engagements states, if a number of participants having the disengaged state exceeds a first threshold; providing a warning only to the participants who have the disengaged state, if the number of the participants who have the disengaged state does not exceed a second threshold; and providing an environmental feedback to a meeting room system in accordance with the group engagement state.

A non-transitory computer readable medium containing a computer program storing computer readable code for improving a group interaction in a meeting in which two or more participants participate in, the program being executable by a computer to cause the computer to perform a process comprising: calculating, for each of the two or more participants, an individual engagement state based on attitudes of the participant, wherein the individual engagement state is an engagement state of the participant to the meeting including an engaged state and a disengaged state; calculating a group engagement state based on the attitudes of the two or more participants, wherein the group engagement state is an engagement state of the two or more participants to the meeting; and providing a feedback, comprising: proving a group warning to all of the participants regardless of their individual engagements states, if a number of participants having the disengaged state exceeds a first threshold; providing a warning only to the participants who have the disengaged state, if the number of the participants who have the disengaged state does not exceed a second threshold; and providing an environmental feedback to a meeting room system in accordance with the group engagement state.

A system is disclosed for improving a group interaction in a meeting in which two or more participants participate in, the system comprising: a processor configured to: calculating, for each of the two or more participants, an individual engagement state based on attitudes of the participant, wherein the individual engagement state is an engagement state of the participant to the meeting including an engaged state and a disengaged state; calculating a group engagement state based on the attitudes of the two or more participants, wherein the group engagement state is an engagement state of the two or more participants to the meeting; and providing a feedback, comprising: proving a group warning to all of the participants regardless of their individual engagements states, if a number of participants having the disengaged state exceeds a first threshold; providing a warning only to the participants who have the disengaged state, if the number of the participants who have the disengaged state does not exceed a second threshold; and providing an environmental feedback to a meeting room system in accordance with the group engagement state.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION

Reference will now be made in detail to the present preferred embodiments of the invention, examples of which are illustrated in the accompanying drawings. Wherever possible, the same reference numbers are used in the drawings and the description to refer to the same or like parts.

In accordance with an exemplary embodiment, this disclosure uses engagement as an example of implementation of a method and system of user state detection. Engagement herein can be defined as an attentive state of listening, observing, and giving feedback, or a protagonistic action in a group interaction. Engagement levels, for example, can influence flow and productivity of group interaction. Hence, it can be of interest to create awareness about engagement levels, for example, for improving collaboration among participants in a group meeting.

Figure 2:
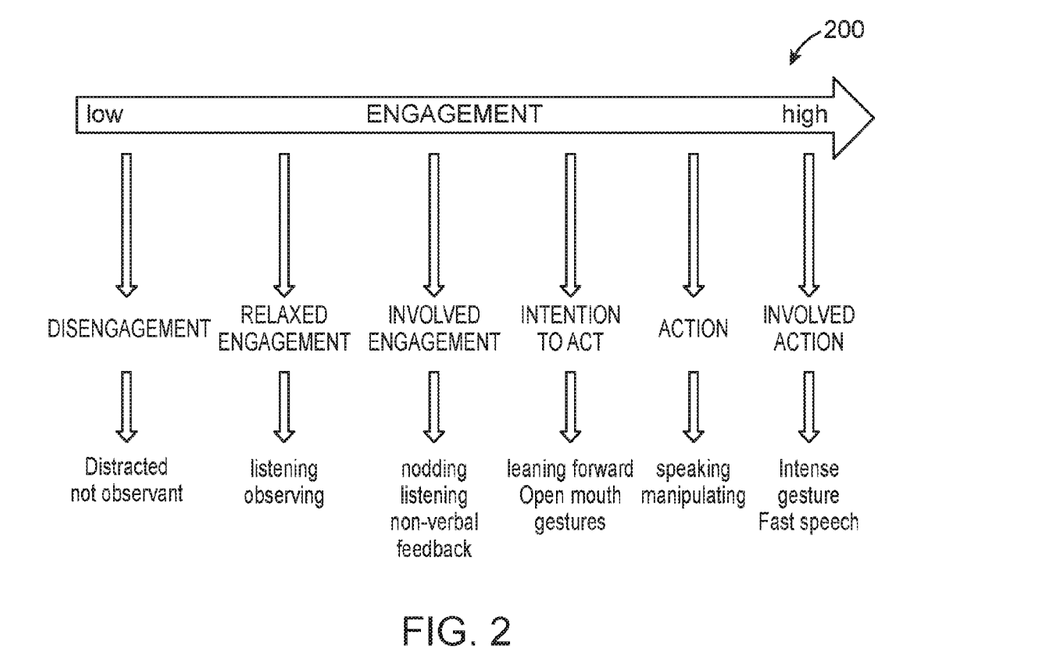
FIG. 2 is an illustration of an engagement scale in accordance with an exemplary embodiment.

FIG. 2 is an illustration of an engagement scale 200 in accordance with an exemplary embodiment. In a group meeting scenario, for example, there can be different levels of engagement for each of the participants (or user states) ranging from, disengagement (or disengaged) to involved action. For example, as shown in FIG. 2, the different levels on the engagement scale can include:

(a) disengagement, for example, distracted and/or not observant;

(b) relaxed engagement, for example, listening or observing;

(c) involved engagement, for example, nodding, listening, and/or non-verbal feedback;

(d) intention to act, for example, leaning forward, and/or open mouth gestures;

(e) action, for example, speaking and/or manipulating; and (f) involved action, for example, intense gesture and/or fast speech.

In accordance with an exemplary embodiment, for example, creating a measure of the user state and herein engagement in a group interaction can allow for implementation related to generation of feedback, and improvement of gesture detection and acting user detection as disclosed herein.

The Multimodal Data

In accordance with an exemplary embodiment, a multimodal data approach can be used to detect and evaluate engagement and user state.

The Body Posture Component Data

Figure 3:
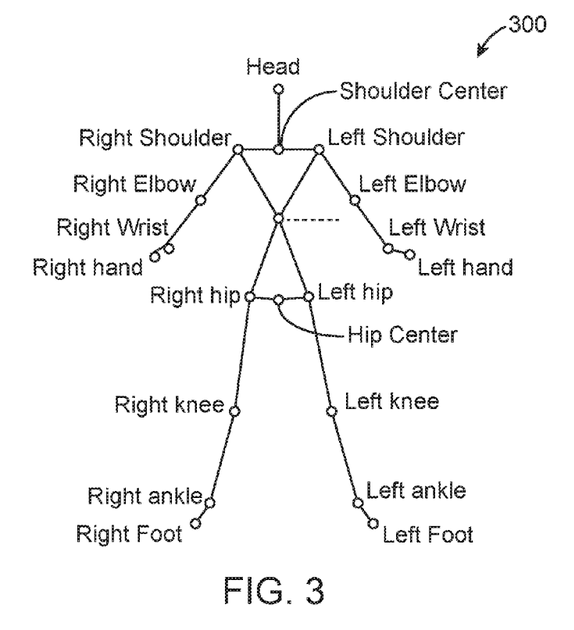
FIG. 3 is an illustration of three-dimensional (3D) positions of the joints used for deriving features in accordance with an exemplary embodiment.

In accordance with an exemplary embodiment, one set of classifiers can be based on body posture and gesture. FIG. 3 is an illustration of three-dimensional (3D) positions 300 of the joints used for deriving features in accordance with an exemplary embodiment. The system and method as disclosed herein can use 3D skeleton information as well as two-dimensional (2D) image information.

In accordance with an exemplary embodiment, at least one sensor can be installed at known locations where each of the users is visible. For example, 3D positions of the 9 (nine) major joints of the upper body human skeleton system can be detected using the depth camera and motion sensors (FIG. 3). The 6 extra detected joints, right-left foot, right-left knee, and right-left hip, for example, may not be used for deriving the features since they may be hidden behind a desk in a meeting scenario. In addition, the two (2) extra detected joints, right-left hand may also not be used for deriving the features since they are very close to the wrist joints, and thus may be redundant.

The Voice Data

In accordance with an exemplary embodiment, this data set can include the identification of pitch, speech frequency, utterance detection, and volume among other voice analysis classifiers informing the user state detection. For example, stereo sensors can be used to further support the active user detection.

The Facial Data

In accordance with an exemplary embodiment, facial data analysis can be performed using 2D RGB (red, green, and blue) and 3D images to distinguish facial features used among other things for the generation of emotion classifiers informing the user state detection.

The Weight Data

In accordance with an exemplary embodiment, weight sensor in chairs can allow for an additional evaluation of posture based on weight distribution. The use of weight sensors in the chairs can allow for cross correlation in a more stable user state detection.

User State Detection—Engagement

In order to be able to track the engagement level, tracking the interaction engagement of participants through biometric analysis, for example, body pose analysis, voice analysis, and, facial expression identification can be used. In accordance with an exemplary embodiment, the non-verbal cues can convey information about a speaker's internal state, which can create a non-intrusive measure. Based on this data, feedback can be created.

In accordance with an exemplary embodiment, a multimodal engagement user state detection process is proposed. For example, in an exemplary scenario, multiple or a plurality of people can be within the operating range of the sensor, for example, field of view of the camera. For example, this module can identify the state of the participants on the engagement scale, as shown in FIG. 2, from disengaged up to involved action.

Classifiers

Using the biometric information the module identifies the person who exhibits a specific combination of classifiers of all categories. The classifiers, for example, body posture components, can be chosen based on research, relating them to attentiveness and engagement.

In accordance with an exemplary embodiment, the analysis can be on a frame-by-frame basis. Each frame can be analyzed regarding all classifiers, for example, is the person 1) raising a hand (3D), 2) facing a display (2D), 3) leaning forward (3D), 4) leaning backward (3D), 5) uttering a feedback (voice), 6) slouching (3D), or 7) changing position (weight), for example, in the last 60 frames.

In accordance with an exemplary embodiment, classifiers can be evaluated as being exhibited or not exhibited in each frame for each individual participant as a binary value. For example, they can be defined based on heuristics for specific postures, and a support vector machine (SVM) feature analysis (or machine learning algorithm) for more complex movement patterns.

Figure 4:
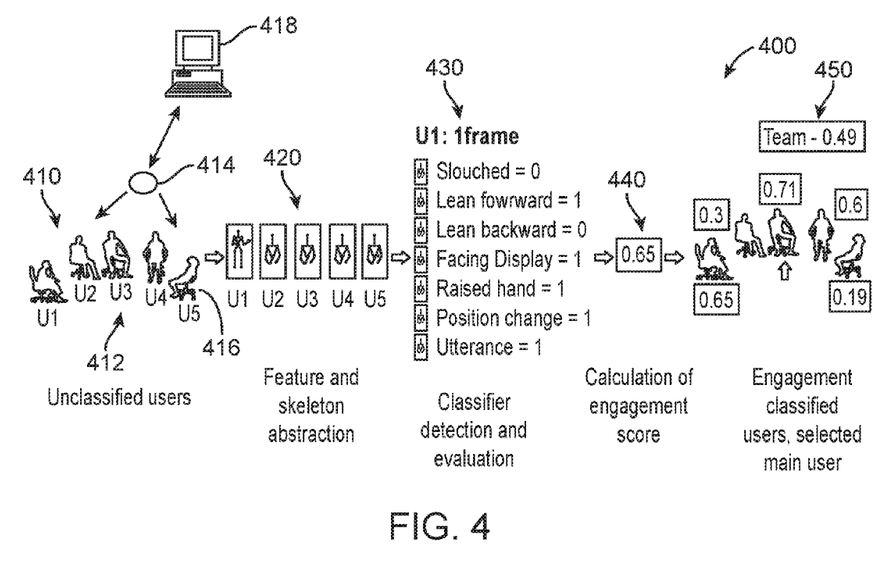
FIG. 4 is an illustration of a system approach in accordance with an exemplary embodiment.

FIG. 4 is an illustration of a system 400 approach in accordance with an exemplary embodiment. As shown in FIG. 4, the system 400 includes a collaboration scenario 410, which includes a plurality of unclassified users (or participants) 412 in which feature and skeleton abstraction is performed by a feature and skeleton abstraction module 420. The feature and skeleton abstraction for each of the plurality of unclassified users (or participants) 412 can then be input into a classifier detection and evaluation module 430. The classifier detection and evaluation module 430 is configured to classify body components, for example, slouched=0, lean forward=1, lean backward=0, facing display=1, raised hand=1, position change=1, and utterance=1. The classifiers are then used to generate a calculation of engagement score 440, which is between 0 and 1.0, for each of the unclassified users 410. Each of the unclassified users is then assigned an individual engagement classifier and a group or term classifier 450, for example, team=0.49. In accordance with an exemplary embodiment, the engagement score 440 can be used to generate or determine an engagement state for each of the one or more users (or participants) 412.

In accordance with an exemplary embodiment, the collaboration scenario 410 as shown in FIG. 4, can include, for example, one or more data input devices 414, 416. The one or more data input devices 414, 416, can include, for example, a motion and/or depth sensor, an RGB camera, a weight sensor for each of the one or more chairs in the meeting room, and/or microphones. For example, in accordance with an exemplary embodiment, an array of microphones can be used to detect the direction and distance of a voice source.

In accordance with an exemplary embodiment, the feature and skeleton abstraction module 420 can be configured to receive data in the form of audio, video, depth, and/or weight data for each of the plurality of unclassified users 412. The data can be generated, for example, using one or more motion and/or depth sensors, in combination with, for example, video cameras, audio devices, and/or weight sensors. For example, the audio, video, and/or depth data can be obtained using a video camera, for example, an RGB-D camera, and wherein the RGB-D camera produces a time-series of RGB frames and depth frames. In accordance with an exemplary embodiment, depth sensors with the real-time skeleton extraction have generated interest in human gesture recognition, which can use a stream of skeleton data from a depth sensor for generating input data. For example, in accordance with an exemplary embodiment, the sensors can capture the non-verbal behavior of the unclassified users.

In accordance with an exemplary embodiment, for example, the feature and skeleton abstraction module 420 and the classifier detection and evaluation module 430 can be combined in one computer device 418, for example, a standalone computer, or can be contained within one or more computer devices 418, wherein each of the one or more computer devices 418 has a memory, a processor, an operating system and/or software, and a graphical user interface (GUI) or display. In accordance with an exemplary embodiment, for example, biometric information such as skeleton joint 3D locations, RGB, and depth information can be transferred over a communication network (1050, FIG. 10) to be analyzed in a distributed platform.

Finite State Machine

In order to increase efficiency and accuracy of the algorithm for the engagement classifier, a Finite State Machine (FSM) can be implemented. In accordance with an exemplary embodiment, a state is a description of the mental state or engagement of the user that can be anticipated to change over time. A transition is initialized by a change in condition, or a combination of conditions, that results in a change of state. For example, when using a gesture recognition system to find out meaningful gestures of users, swiping or pointing can happen in some states such as in the "intention to act" state and similar gestures in a "disengagement" state will be ignored or interpreted differently.

In accordance with an exemplary embodiment, finite-state machine representation can associate actions with a state, for example, Entry actions: performed when entering the state
State actions: performed during the state
Exit actions: performed when exiting the state In accordance with an exemplary embodiment, the FSM can be configured to allow for faster analysis of relevant classifier changes that can result in a change in state between two given frames. In accordance with an exemplary embodiment, a state transition table as well as a transition diagram to represent the FSM can be used. Table 1 shows the general state transition for an FSM with three (3) states. For example, combination of current state (for example, $S_2$) and condition (for example, $C_{23}$) shows the next state (for example, $S_3$). The transition between states has been highlighted in the table.

TABLE 1

General State transition table

| Conditions | Current state | | |
|---|---|---|---|
| | State $S_1$ | State $S_2$ | State $S_3$ |
| $C_{11}$ | $S_1$ | $S_2$ | $S_3$ |
| $C_{12}$ | $S_2$ | $S_2$ | $S_3$ |
| $C_{13}$ | $S_1$ | $S_2$ | $S_3$ |
| $C_{21}$ | $S_1$ | $S_1$ | $S_3$ |
| $C_{22}$ | $S_1$ | $S_2$ | $S_3$ |
| $C_{23}$ | $S_1$ | $S_3$ | $S_3$ |
| $C_{31}$ | $S_1$ | $S_2$ | $S_1$ |
| $C_{32}$ | $S_1$ | $S_2$ | $S_2$ |
| $C_{33}$ | $S_1$ | $S_2$ | $S_3$ |

Figure 5:
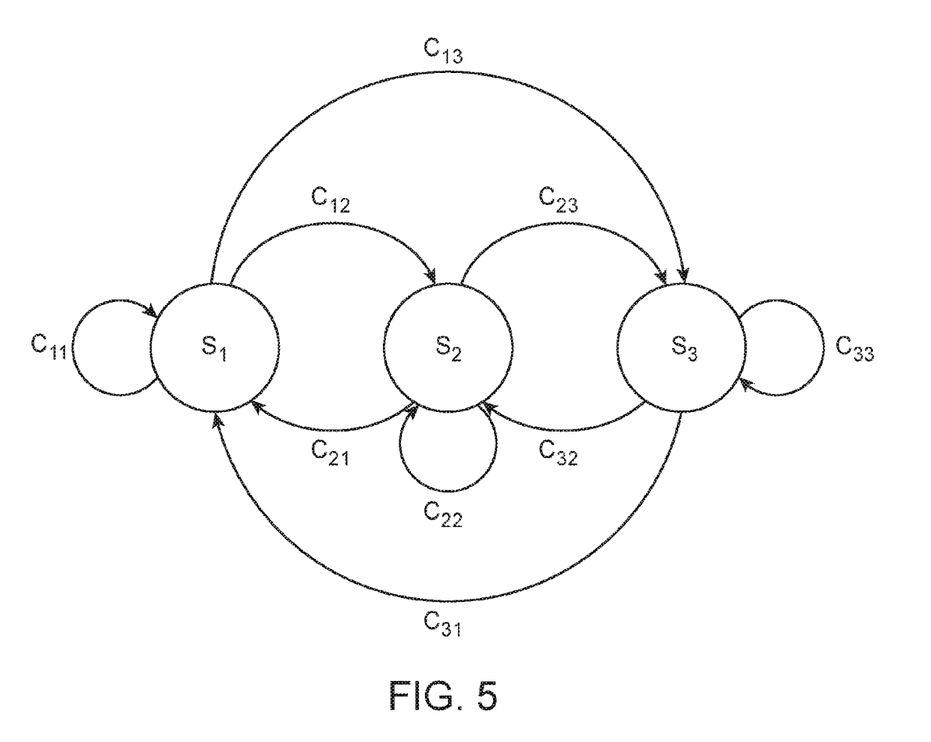
FIG. 5 is an illustration of a general finite state machine (FSM) transition diagram in accordance with an exemplary embodiment.

The equivalent transition diagram for Table 1 is presented in FIG. 5.

In accordance with an exemplary embodiment, the transition between two different states in FSM can be seen in the equivalent transition diagram as shown in FIG. 5. In addition, conditions of staying in each state can be the negation of transition conditions from the same state.

In accordance with an exemplary embodiment, an engagement FSM can be a sextuple ($\Sigma$, $\Gamma$, S, $s_0$, $\delta$, $\omega$), where:

$\Sigma$ is the input alphabet (a finite non-empty set of symbols).
$\Gamma$ is the output alphabet (a finite, non-empty set of symbols).
S is a finite, non-empty set of engagement states.
$s_0$ is the initial engagement state, an element of S. If there is more than one initial state, $s_0$ is a set of initial states.
$\delta$ is the state-transition function: $\delta: S \times \Sigma \rightarrow S$.
$\omega$ is the output function.

In accordance with an exemplary embodiment, if the output function is a function of a state and input alphabet ($\omega: S \times \Sigma \rightarrow \Gamma$) that definition corresponds to the Mealy model, and can be modeled as a Mealy machine. If the output function depends only on a state ($\omega: S \rightarrow \Gamma$) that definition corresponds to the Moore model, and can be modeled as a Moore machine. An FSM with no output function at all is known as semi-automation or transition system.

Weights and Final Engagement Score

In accordance with an exemplary embodiment, the binary values for the individual classifiers can be weighted based on the relative influence in the training data and summed up to the engagement score. The engagement score thereby assumes a value, for example, between 0 and 1. In accordance with an exemplary embodiment, the engagement score can be calculated based on the outputs of FSM, wherein $\omega: S \times \Sigma \rightarrow \Gamma$.

The engagement score can be calculated using a formula:

$W \cdot G$ which $W$ is vector of weights $[w_1, w_2, w_3, w_4, w_5, \ldots, w_n]$ and $G$ is the vector of binary classifiers $[g_1, g_2, g_3, g_4, g_5, \ldots, g_n]$ such that $g_1, g_2, g_3, g_4, g_5, \ldots, g_n$ are 0 or 1 based on the output of the binary classifiers.

The calculation of the engagement score is as follows:

$w_1 * g_1 + w_2 * g_2 + w_3 * g_3 + \ldots + w_n * g_n = \Sigma(w_i * g_i) =$ engagement score In accordance with an exemplary embodiment, the engagement state can also be evaluated based on thresholds related to the engagement score. For example, an increase in the engagement score can constitute an increase in the engagement level, were the level changes once a specific numeric threshold of the engagement score is crossed. For example, disengagement<very low engagement score
relaxed engagement>low engagement score
involved engagement>low/medium engagement score
intention to act>medium engagement score
action>medium high engagement score
involved action>high engagement score Based on the individual engagement score the team engagement score is calculated as the sum. Furthermore, the engagement level between two (2) participants can be calculated taking direction of posture into account. For example, in accordance with an exemplary embodiment, the engagement score can reflect, for example, the engagement level of the team, the dynamics between team members, and the interaction with objects and interfaces.

Application of Engagement Detection

In accordance with an exemplary embodiment, for example, in a meeting in which multiple participants are in one room, one active participant normally speaks and/or interacts with a display at a time while others listen and observe. In addition, throughout the meeting, the active participant can change. In accordance with an exemplary embodiment, calculating the engagement level of individual and group can allow for feedback of group activities, which can help enable managerial and environmental adjustment to create a more engaging and thereby productive work environment, and improve user detection and increase gesture recognition accuracy. In accordance with an exemplary embodiment, the application of the engagement score can be realized as depicted in FIG. 6.

Figure 6:
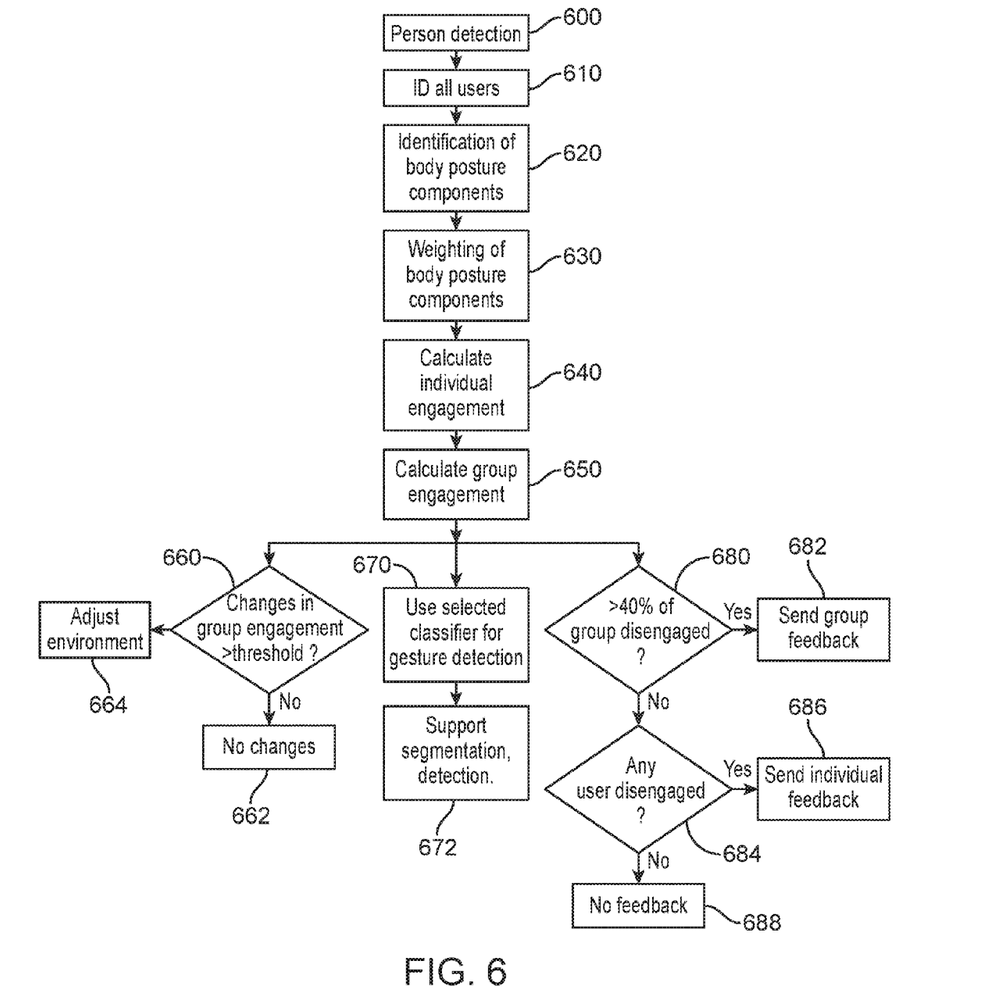
FIG. 6 is an illustration of a flowchart for engagement detection in accordance with an exemplary embodiment.

As shown in FIG. 6, the engagement score can be calculated by initially detecting each of the participants or users in step 600. In step 610, each of the participants or users is identified. In step 620, body posture components are identified. In step 630, weighting of body posture components is performed. In step 640, an individual engagement score is calculated for each of the participants or users. In step 650, a group engagement score is calculated.

In step 660, a determination is made if the change in group engagement score is greater than a predefined threshold. If the change in the group engagement score is not greater than the predefined threshold, in step 662, no environmental adjustment is made. However, if the change in the group engagement score is greater than the predefined threshold, in step 664, an adjustment can be made.

In accordance with an exemplary embodiment, the environmental adjustment or change can include, for example, providing a feedback, which can include: providing a group warning to all of the participants regardless of their individual engagements states, if a number of participants having the disengaged state exceeds a first threshold; providing a warning only to the participants who have the disengaged state, if the number of the participants who have the disengaged state does not exceed a second threshold; and/or providing an environmental feedback to a meeting room system in accordance with the group engagement state. In accordance with an exemplary embodiment, the first threshold is higher than the second threshold.

In accordance with an exemplary embodiment, the feedback can be provided based on the attitudes of the participants that are made during a certain time frame. In addition, an environmental feedback to support the meeting can also be provided if the number of participants having the disengaged state exceeds the first threshold. For example, the environmental feedback can be provided when changes in the group engagement state is greater than a third threshold.

In step 670, a user selected classifier for gesture detection is performed. In step 672, the segmentation and detection of the selected classifier for gesture detection is supported.

In step 680, a determination can be made if a predetermined number of the group is disengaged, for example, 40%, and if in step 680, it is determined that the group is disengaged, the process continues to step 682, where group feedback is sent. If the number in the group does not exceed the predetermined number, in step 684, a determination can be made, if one or more of the participants or users are disengaged. In step 686, if one or more of the participant or users are disengaged, the individual participant or user can be sent feedback in the form of a message or signal. In step 688, if none of the participants or users is disengaged, no feedback is given.

Improvement of Gesture Recognition

In a system where continuous actions are taking place over a long period of time, it is required to segment out the different meaningful actions, ignore meaningless actions and perform the required task for each of the meaningful actions. In accordance with an exemplary embodiment, this can be performed by an action segmentation and recognition module as disclosed herein. In addition, the detection of the user engagement state can support and improve current gesture segmentation and recognition.

User Identification

Meeting scenarios with far-range interactive displays can create the "Midas Touch Problem", for example, where the system is always on. In accordance with an exemplary embodiment, the engagement score supports user identification and relevant gesture recognition in so far it can create a threshold beneath which gestures can be excluded based on a lack of engagement and interaction intention. In addition, the engagement score can allow one to compare the engagement level of various participants and select the main participant (or user) as the participant (or user) with the highest engagement score.

Gesture Segmentation

Figure 7:
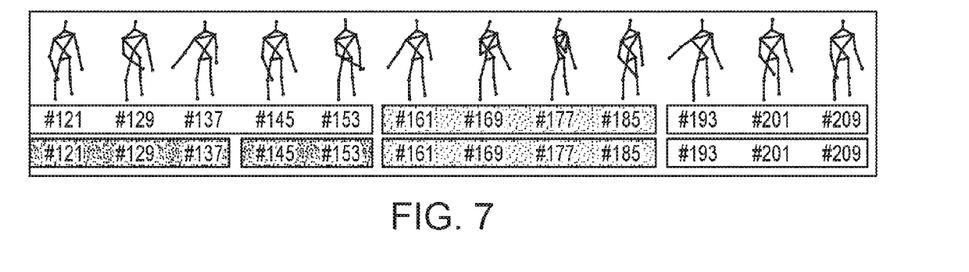
FIG. 7 is an illustration of an example of segmenting a series of frames into different gestures marked in different colors in accordance with an exemplary embodiment.

Accurate gesture segmentation is still a challenge in gesture detection. For example, in accordance with an exemplary embodiment, gesture segmentation can involve examination of a frame or a set of frames to decide when the current gesture ends and a new one begins as visualized in FIG. 7. As shown in FIG. 7, gesture segmentation can involve three steps:

(1) the first step applies Maximum Mean Discrepancy (MMD) criterion to detect the change-points over continuous gestures as the initial estimated cuts of the gesture transitions;

(2) the second step uses kinematic constraints to revise an initial estimated cut to an accurate gesture transition position; and (3) a probability density estimation is used to estimate the hand motion between two cuts to eliminate unintentional movements and non-gesture segments.

In accordance with an exemplary embodiment, the engagement segmentation can improve the gesture segmentation since the evaluation of the engagement state can help separate relevant and non-relevant gestures insofar that a low engagement score indicates that a user does not want to interact but is merely exhibiting body motion. The engagement score thereby helps the system to understand when a person intends to interact with the system and turn on the gesture segmentation module. In addition, the level of engagement provides an indication of intensity of motion. For example, the higher the engagement level, the more frequent the gestures and the higher the speed of the gesture, and which can provide additional information to the expected length of individual segments. The individual classifiers can also relate body movement to specific postures. For example, if a classifier changes its state the likelihood increases that a gestures changes or is initiated. Hence, the change in classifiers supports the segmentation of motion on a frame-by-frame level and can trigger segmentation.

Figure 8:
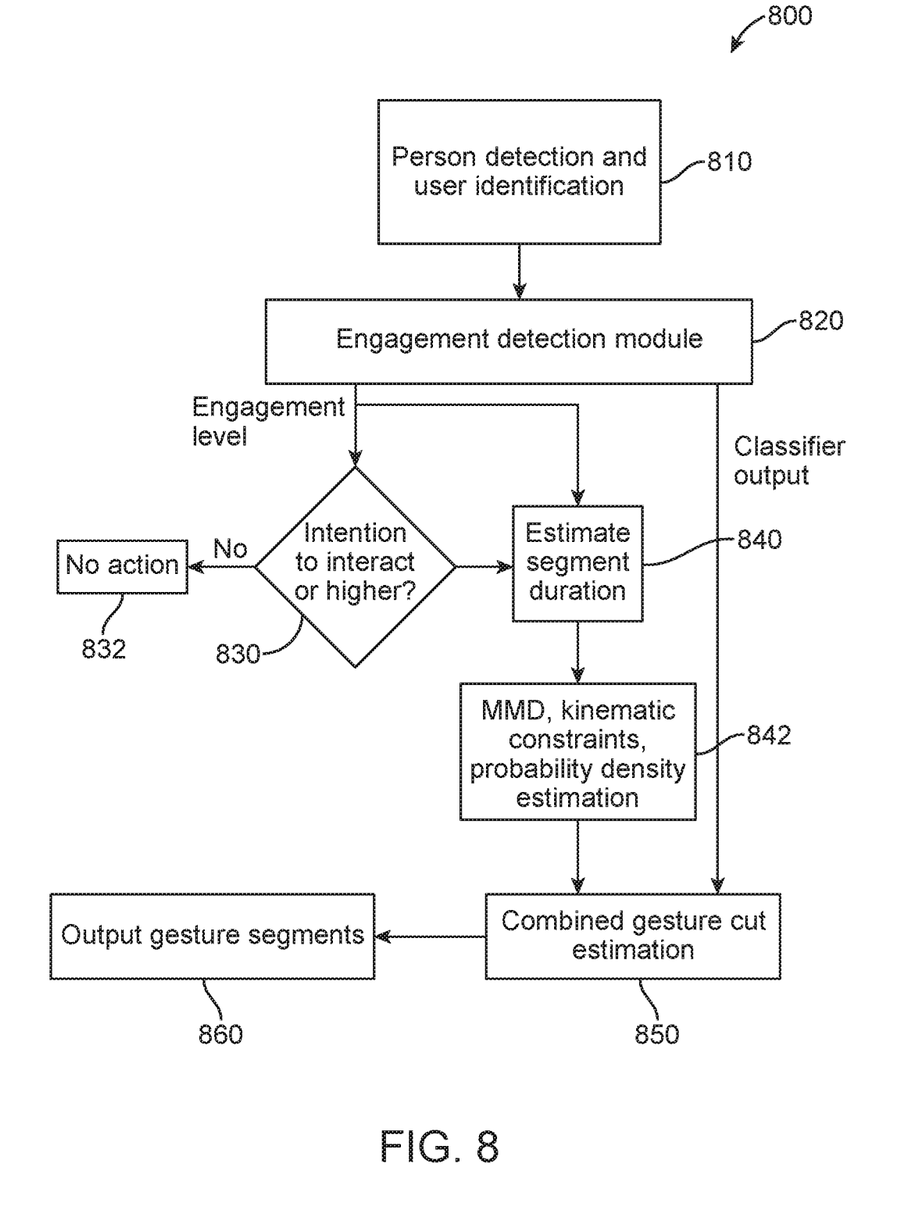
FIG. 8 is an illustration of a flowchart for gesture segmentation aided by engagement detection in accordance with an exemplary embodiment.

In accordance with an exemplary embodiment, a flowchart for gesture segmentation aided by engagement detection 800 is shown in FIG. 8. As shown in FIG. 8, in step 810, person detection and user identification is performed. In step 820, the person detection and user identification information is input into an engagement detection module. In the engagement detection module, an engagement level is determined, and the process determines in step 830, if the "intention to interact" or higher is detected. If the engagement level is not "intention to interact" or higher, in step 832, no action is performed. If the process determines that the "intention to interact" or higher is detected, the process continued to step 840, where an estimate of segment duration can be performed. In step 842, Maximum Mean Discrepancy (MMD), kinematic constraints, and probability density estimation is performed on the estimated segment duration. In step 850, the gesture cut estimations are combined, and gesture segments can be output in step 860.

Gesture Classification

Once the segmentation is performed, the meaningful gestures can be recognized. In accordance with an exemplary embodiment, a training set consisting of several actors performing the same set of meaningful gestures can be used to extract features and train a support vector machine (SVM classifier). The features from the extracted segments are then fed to the SVM for recognizing actions.

In accordance with an exemplary embodiment, challenges in gesture recognition can include determining whether the segmented gesture is an unknown gesture or whether it belongs to the set of recognized/meaningful gestures, and accurate labeling of meaningful gestures in the presence of noise and variation in pose.

In accordance with an exemplary embodiment, engagement detection can help with both these challenges. For example, the individual body posture component classifiers can give additional information to improve accuracy of gesture classification. If the classification for a specific segment has a low confidence, specific classifiers that relate to specific gestures can be used as support variables. The classifiers inform on body postures that are related to gestures. For example, if a specific set of classifiers exhibited in a specific gesture are identified, the likelihood of that gesture increases in the following frames. Using the finite state machine, the engagement score can help limit the number of possible gestures in each frame through excluding unlikely and unrelated features and gestures. The classifiers can also provide additional posture information to the gesture classification module to determine whether the gesture is unknown or meaningful.

Pointing Accuracy

In addition, one challenge of gesture detection is the accuracy of pointing. The engagement level can detect pointing and tracking to increase stability. In accordance with an exemplary embodiment, pointing can have two segments. The two segment can include finding the point on a screen that the user wants to highlight/point out, and tracking the pointing hand and repositioning the highlighted point appropriately when the person continues to point.

During the first step users concentrate on their motion and the target, and during the second step, however, for example, the user might focus on the conversation and other meeting participants, and thereby the users loses his/her aim and the pointing hand sways.

In accordance with an exemplary embodiment, the engagement score and specific classifiers can allow for the additional information on whether a participant is only engaged with the display or also with other participants. If the user is focused on the display, pointing and tracking will be active. When the user switches to pointing and interaction with other participants, the tracking can be disabled to make the pointing more stable for the duration of the shifted focus.

Engagement Feedback for Meeting Participant and Infrastructure Management

In accordance with an exemplary embodiment, the feedback system can provide different kinds of feedback, based on the individual user state as well as the group state. For example, the engagement score and the group engagement score can be used for generating a feedback signal. The feedback signal can be in the form of audio, visual, vibration alert by means of a wearable device, or any kind of group based device, as well as responses of equipment or environment. In accordance with an exemplary embodiment, the system can monitor the engagement score (or any other user state) for a specified duration, for example, a sufficiently long duration (for example, approximately 1 minute) before sending the feedback. In accordance with an exemplary embodiment, if the time frame (or period) is too short, for example, second by second, the feedback can be interruptive and would respond to too many fluctuations instead of bigger trends.

In order to generate feedback for engagement in meeting interaction, for example, the steps in FIG. 6 can be performed. In accordance with an exemplary embodiment, for example, the participants of the meeting can be detected and identified before the individual engagement is calculated. Based on the individual engagement the group engagement is evaluate. In accordance with an exemplary embodiment, these two components form the basis for the feedback generation.

Meeting Dynamic Feedback

All participants: A group warning will appear, for example, on a common display, which is visible to all of the participants, for example, as simple pop up notifying "The group is disengaged". It can be triggered, for example, if the group feedback is classified in this example as disengagement, which means more than a predetermined number or percentage, for example, 40% of the individual feedbacks are classified as disengaged, or the group engagement level is classified as disengaged. The public feedback can be used as an encouragement to change the meeting activity or take a break to all the group to refocus.

Individuals: If the group score, for example, is above the predetermined number or percentage, for example, 60% engaged threshold related to the engagement example, in accordance with an exemplary embodiment, only the participants that are disengaged will be notified using an individual device. The individual device can be, for example, a lock-screen message on the smart phone indicating "You are disengaged, please reengage in your meeting". Thereby, the overall group will not be distracted.

Figure 9:
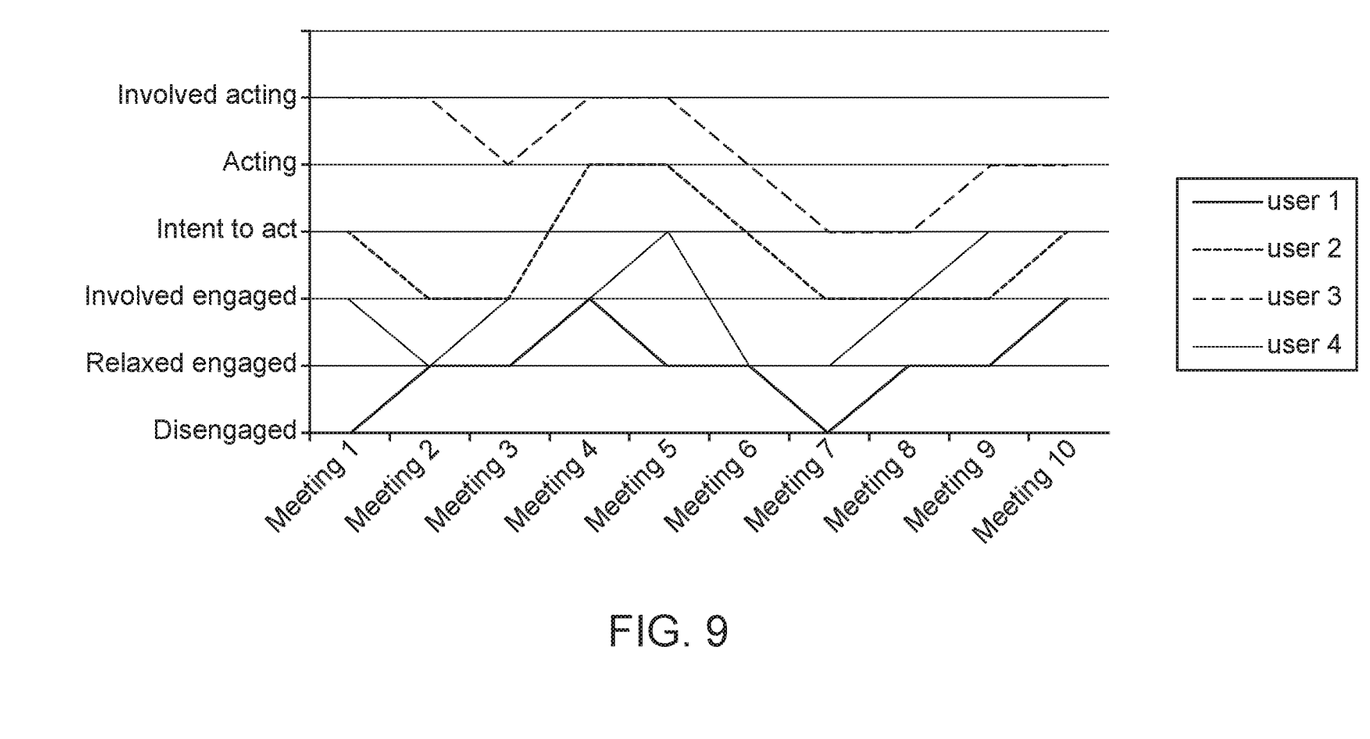
FIG. 9 is an illustration of an exemplary engagement score by an individual over several meetings in accordance with an exemplary embodiment.

Managerial: A record of engagement levels will provide insight of bigger trends in meeting dynamic, such as overall engagement at specific meeting times, participation, and dominance in meetings (FIG. 9). These insights allow for adjustments of meeting times, necessary participants, necessary changes in interaction protocols, and others aspects related to meeting productivity. This engagement score can also be on a dyad level (or between, for example, two participants), evaluating an interaction between specific participants of a meeting to interpret dynamics. The engagement level can be stored in a comprehensive cross table to see the engagement level between all possible participant combinations.

Environmental Feedback

Activity: An environmental feedback will be send to the room systems based on the group activity and engagement level. Higher activity creates higher heat loads and more oxygen consumption. This information will help to regulate air quality by increasing airflow and temperature comfort by increasing cooling. This way the system can react faster to diagnosed loads and prevent overheating.

Support: A state of group disengagement can trigger the environmental systems to, for example, lower the room temperature or brighten the lights, which has the effect of waking meeting participants up. For example, if too many participants are relaxed, engaging the light, by turning or making, the lights brighter. Alternatively, if too many participants are disengaged, the air temperature of the room can be cooled, for example, 2 to 3 degrees Fahrenheit (° F.).

Operation Intent Feedback

Object specific: The engagement level can be used to identify the user intent to act with various responsive objects in a room. In accordance with an exemplary embodiment, it can give additional information to responsive objects as to which user wants to interact with which object in a room, based on directional body posture, voice, or motion. For example, in accordance with an exemplary embodiment, an engagement table can be used to track each participant's potential engagement level with each object.

Figure 10:
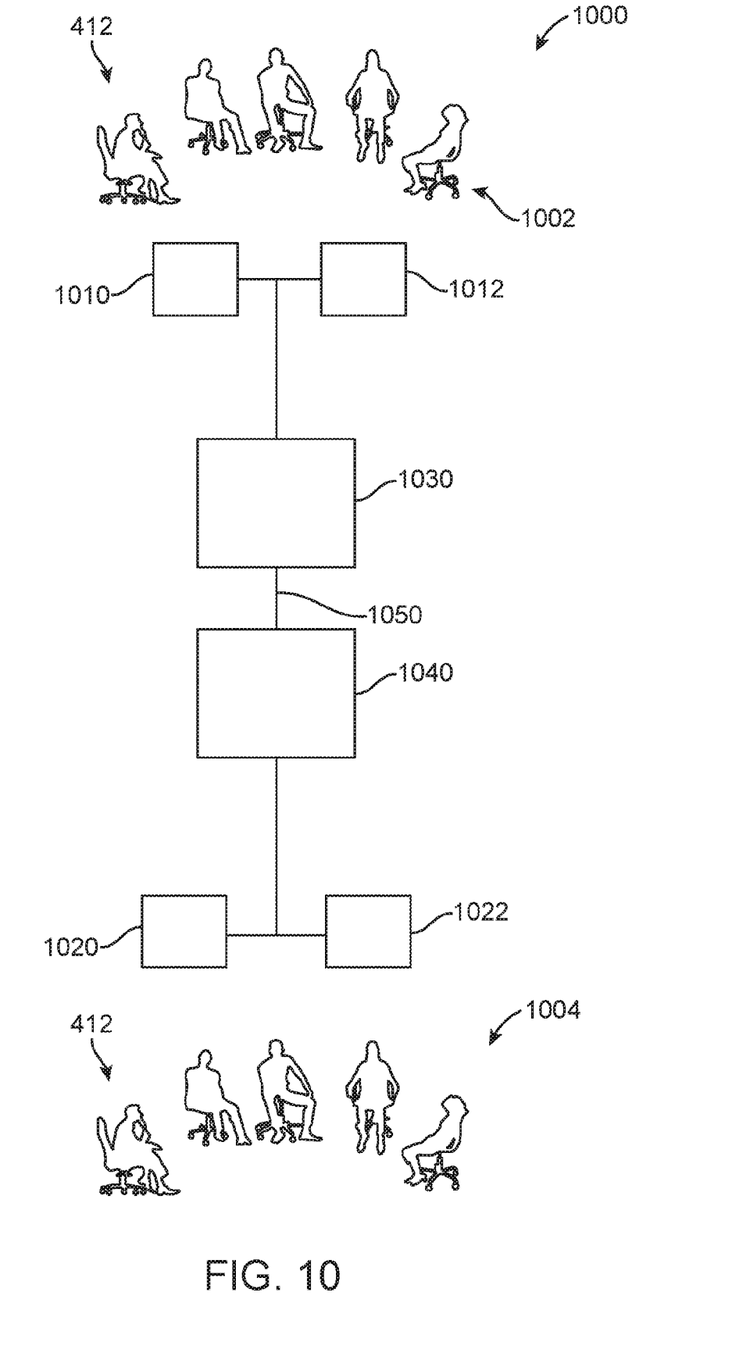
FIG. 10 is an illustration of a teleconference scenario in which the individual or groups of unclassified users are connected to at least one server, and wherein the at least one server is configured to process the data in accordance with methods and processes as disclosed herein.

FIG. 10 is an illustration of a teleconference scenario 1000 in which individuals or groups of unclassified users are connected to at least one server 1030, 1040, and wherein the at least one server 1030, 1040 is configured to process the data in accordance with methods and processes as disclosed herein. As shown in FIG. 10, in a teleconference scenario 1000, two or more individuals, or groups of unclassified users (or participants) 412 can be located in a different office and/or location 1002, 1004. Each of the different offices and/or locations 1002, 1004, is preferably equipped with one or more data input devices 1010, 1012, 1020, 1022. The one or more data input devices 1010, 1012, 1020, 1022 can include, for example, a motion and/or depth sensor, an RGB camera, a weight sensor for each of the one or more chairs in the meeting room, and/or microphones as disclosed above.

In accordance with an exemplary embodiment, each set of one or more data input devices 1010, 1012, 1020, 1022, is preferably connected to at least one server or computer device 1030, 1040. In accordance with an exemplary embodiment, the at least one server or computer device 1030, 1040 can be connect via a communication network 1050. Alternatively, a single server or computer device, for example, only server or computer device 1030 can be used for both sets of one or more data input devices 1010, 1012, 1020, 1022, and the one or more data input devices 1010, 1012, 1020, 1022 can be connected to the at least one server or computer device 1030 via a communication network 1050.

In accordance with an exemplary embodiment, for example, the communication network 1050 can be a public telecommunication line and/or a network (for example, LAN or WAN). Examples of the communication network 1050 can include any telecommunication line and/or network consistent with embodiments of the disclosure including, but are not limited to, telecommunication or telephone lines, the Internet, an intranet, a local area network (LAN), a wide area network (WAN) and/or a wireless connection using radio frequency (RF) and/or infrared (IR) transmission.

In accordance with an exemplary embodiment, each of the at one or more servers 1030, 1040, or single server 1030 can include a feature and skeleton abstraction module 420 and/or a classifier detection and evaluation module 430 as disclosed above, and wherein the at least one server 1030, 1040 can be configured to carry out the processes as disclosed herein, for example, calculating an engagement score as disclosed in connection with FIG. 6 and/or gesture segmentation as shown in FIG. 8. The servers or computer devices 1030, 1040, for example, can include a memory, a processor, an operating system and/or software, and a graphical user interface (GUI) or display. In accordance with an exemplary embodiment, for example, biometric information such as skeleton joint 3D locations, RGB, and depth information can be transferred over the communication network 1050 to be analyzed in a distributed platform as disclosed herein.

In accordance with an exemplary embodiment, a non-transitory computer readable medium containing a computer program storing computer readable code for detecting inter-action between two or more participant is disclosed, the program being executable by a computer to cause the computer to perform a process comprising: capturing at least one three-dimensional (3D) stream of data on the two or more participants; extracting a time-series of skeletal data from the at least one 3D stream of data on the two or more participants; classifying the time-series of skeletal data for each of the two or more participants based on a plurality of body position classifiers; calculating an engagement score for each of the two or more participants based on the classifying of the time-series of skeletal data for each of the two or more participants; and providing a feedback in accordance with at least one of the engagement scores of the two or more participants.

In accordance with another exemplary embodiment, a non-transitory computer readable medium containing a computer program storing computer readable code for improving a group interaction in a meeting in which two or more participants participate in is disclosed, the program being executable by a computer to cause the computer to perform a process comprising: calculating, for each of the two or more participants, an individual engagement state based on attitudes of the participant, wherein the individual engagement state is an engagement state of the participant to the meeting including an engaged state and a disengaged state; calculating a group engagement state based on the attitudes of the two or more participants, wherein the group engagement state is an engagement state of the two or more participants to the meeting; and providing a feedback, comprising: proving a group warning to all of the participants regardless of their individual engagements states, if a number of participants having the disengaged state exceeds a first threshold; providing a warning only to the participants who have the disengaged state, if the number of the participants who have the disengaged state does not exceed a second threshold; and providing an environmental feedback to a meeting room system in accordance with the group engagement state.

The computer readable recording medium may be a magnetic recording medium, a magneto-optic recording medium, or any other recording medium which will be developed in future, all of which can be considered applicable to the present invention in all the same way. Duplicates of such medium including primary and secondary duplicate products and others are considered equivalent to the above medium without doubt. Furthermore, even if an embodiment of the present invention is a combination of software and hardware, it does not deviate from the concept of the invention at all. The present invention may be implemented such that its software part has been written onto a recording medium in advance and will be read as required in operation.

It will be apparent to those skilled in the art that various modifications and variation can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for detecting interaction between two or more participants in a meeting, the method comprising:
capturing at least one three-dimensional (3D) stream of data on the two or more participants;
extracting a time-series of skeletal data from the at least one 3D stream of data on the two or more participants;
classifying the time-series of skeletal data for each of the two or more participants based on a plurality of body position classifiers;
capturing an audio stream of data on the two or more participants;
classifying the audio stream of data on the two more participants into an utterance classifier based on utterances detected on the audio stream of data, the utterance classifier including at least one of identification of pitch of speech, frequency of speech, and volume of speech;
calculating an engagement score for each of the two or more participants based on the classifying of the time-series of skeletal data and the utterance classifier based on utterances detected on the audio stream for each of the two or more participants; and providing a feedback in accordance with at least one of the engagement scores of the two or more participants.

2. The method of claim 1, comprising:
capturing a weight stream of data on the two or more participants, the weight stream of data corresponding to a weight distribution for each of the two or more participants on a chair received from one or more sensors in the chair; and
adding a weight distribution classifier to the engagement score based the weight distribution for each of the two or more participants.

3. The method of claim 1, comprising:
generating a group engagement score for the two or more participants; and
generating feedback based on the engagement score for each of the two or more participants and the group engagement score, the feedback including one or more of the following:
audio, visual, vibration alert by means of a wearable device, or a change of environmental conditions in a meeting room.

4. The method of claim 1, comprising:
applying a finite state machine model to the time-series of skeletal data for each of the two or more participants.

5. The method of claim 1, comprising:
determining trends in meeting between the two or more participants based on the engagement scores for the two or more participants and a group engagement score; and
adjusting meeting times, participants, and/or interaction protocols based on the determined trends.

6. A method for detecting interaction between two or more participants in a meeting, the method comprising:
capturing at least one three-dimensional (3D) stream of data on the two or more participants;
extracting a time-series of skeletal data from the at least one 3D stream of data on the two or more participants;
classifying the time-series of skeletal data for each of the two or more participants based on a plurality of body position classifiers;
calculating an engagement score for each of the two or more participants based on the classifying of the time-series of skeletal data or each of the two or more participants;
providing a feedback in accordance with at least one of the engagement scores of the two or more participants; and
wherein the classifying of the time-series of skeletal data for each of the two or more participants based on the plurality of body position classifiers comprises:
applying a Maximum Mean Discrepancy (MMD) criterion to the time-series of skeletal data to detect change-points over continuous gestures as an initial estimated cuts of gesture transitions;
using kinematic constraints to revise an initial estimated cut to an accurate gesture transition position; and
using a probability density estimation to estimate a hand motion between two cuts to eliminate unintentional movements and non-gesture segments.

7. A non-transitory computer readable medium containing a computer program storing computer readable code for detecting interaction between two or more participant, the program being executable by a computer to cause the computer to perform a process comprising:
capturing at least one three-dimensional (3D) stream of data on the two or more participants;
extracting a time-series of skeletal data from the at least one 3D stream of data on the two or more participants;
classifying the time-series of skeletal data for each of the two or more participants based on a plurality of body position classifiers;
capturing an audio stream of data on the two or more participants;
classifying the audio stream of data on the two more participants into an utterance classifier based on utterances detected on the audio stream of data, the utterance classifier including at least one of identification of pitch of speech, frequency of speech, and volume of speech;
calculating an engagement score for each of the two or more participants based on the classifying of the time-series of skeletal data and the utterance classifier based on utterances detected on the audio stream for each of the two or more participants; and
providing a feedback in accordance with at least one of the engagement scores of the two or more participants.

8. The non-transitory computer readable medium of claim 7, comprising:
capturing a weight stream of data on a weight distribution of the two or more participants, the weight stream of data corresponding to a weight distribution for each of the two or more participants on a chair received from one or more sensors in the chair; and
adding a weight distribution classifier to the engagement score based the weight distribution for each of the two or more participants.

9. A method for improving a group interaction in a meeting in which two or more participants participate in, the method comprising:
calculating, for each of the two or more participants, an individual engagement state based on attitudes of the participant, wherein the individual engagement state is an engagement state of the participant to the meeting including an engaged state and a disengaged state, wherein the individual engagement state includes:
extracting a time-series of skeletal data from the at least one 3D stream of data on each of the two or more participants;
classifying the time-series of skeletal data for the two or more participants based on a plurality of body position classifiers;
capturing an audio stream of data on the two or more participants;
classifying the audio stream of data on the two more participants into an utterance classifier based on utterances detected on the audio stream of data, the utterance classifier including at least one of identification of pitch of speech, frequency of speech, and volume of speech; and
calculating the individual engagement state for each of the two or more participants based on the classifying of the time-series of skeletal data and the utterance classifier based on utterances detected on the audio stream for each of the two or more participants;
calculating a group engagement state based on the attitudes of the two or more participants, wherein the group engagement state is an engagement state of the two or more participants to the meeting; and
providing a feedback, comprising:
proving a group warning to all of the participants regardless of their individual engagements states, if a number of participants having the disengaged state exceeds a first threshold;

providing a warning only to the participants who have the disengaged state, if the number of the participants who have the disengaged state does not exceed a second threshold; and providing an environmental feedback to a meeting room system in accordance with the group engagement state.

10. The method as claimed in claim 9, wherein the feedback is provided based on the attitudes of the participants that are made during a certain time frame.

11. The method as claimed in claim 9, wherein the first threshold is higher than the second threshold.

12. The method as claimed in claim 9, wherein an environmental feedback to support the meeting is also provided if the number of participants having the disengaged state exceeds the first threshold.

13. The method as claimed in claim 9, wherein environmental feedback is provided when changes in the group engagement state is greater than a third threshold.

14. The method of claim 9, further comprising:

capturing a weight stream of data on the two or more participants, the weight stream of data corresponding to a weight distribution for each of the two or more participants on a chair received from one or more sensors in the chair; and adding a weight distribution classifier to the individual engagement state based the weight distribution for each of the two or more participants.

15. A non-transitory computer readable medium containing a computer program storing computer readable code for improving a group interaction in a meeting in which two or more participants participate in, the program being executable by a computer to cause the computer to perform a process comprising:

calculating, for each of the two or more participants, an individual engagement state based on attitudes of the participant, wherein the individual engagement state is an engagement state of the participant to the meeting including an engaged state and a disengaged state, wherein the individual engagement state includes:

extracting a time-series of skeletal data from the at least one 3D stream of data on each of the two or more participants;

classifying the time-series of skeletal data for the two or more participants based on a plurality of body position classifiers;

capturing an audio stream of data on the two or more participants;

classifying the audio stream of data on the two more participants into an utterance classifier based on utterances detected on the audio stream of data, the utterance classifier including at least one of identification of pitch of speech, frequency of speech, and volume of speech; and calculating the individual engagement state for each of the two or more participants based on the classifying of the time-series of skeletal data and the utterance classifier based on utterances detected on the audio stream for each of the two or more participants;

calculating a group engagement state based on the attitudes of the two or more participants, wherein the group engagement state is an engagement state of the two or more participants to the meeting; and providing a feedback, comprising:

proving a group warning to all of the participants regardless of their individual engagements states, if a number of participants having the disengaged state exceeds a first threshold;

providing a warning only to the participants who have the disengaged state, if the number of the participants who have the disengaged state does not exceed a second threshold; and providing an environmental feedback to a meeting room system in accordance with the group engagement state.

16. The non-transitory computer readable medium of claim 15, wherein the feedback is provided based on the attitudes of the participants that are made during a certain time frame.

17. The non-transitory computer readable medium of claim 15, wherein the first threshold is higher than the second threshold.

18. The non-transitory computer readable medium of claim 15, wherein an environmental feedback to support the meeting is also provided if the number of participants having the disengaged state exceeds the first threshold.

19. The non-transitory computer readable medium of claim 15, wherein environmental feedback is provided when changes in the group engagement state is greater than a third threshold.

20. The non-transitory computer readable medium of claim 15, further comprising:

capturing a weight stream of data on the two or more participants, the weight stream of data corresponding to a weight distribution for each of the two or more participants on a chair received from one or more sensors in the chair; and adding a weight distribution classifier to the individual engagement state based the weight distribution for each of the two or more participants.

* * * * *